No. 721,266. PATENTED FEB. 24, 1903.
H. G. WILSON.
TIRE FASTENER.
APPLICATION FILED JULY 21, 1902.
NO MODEL.
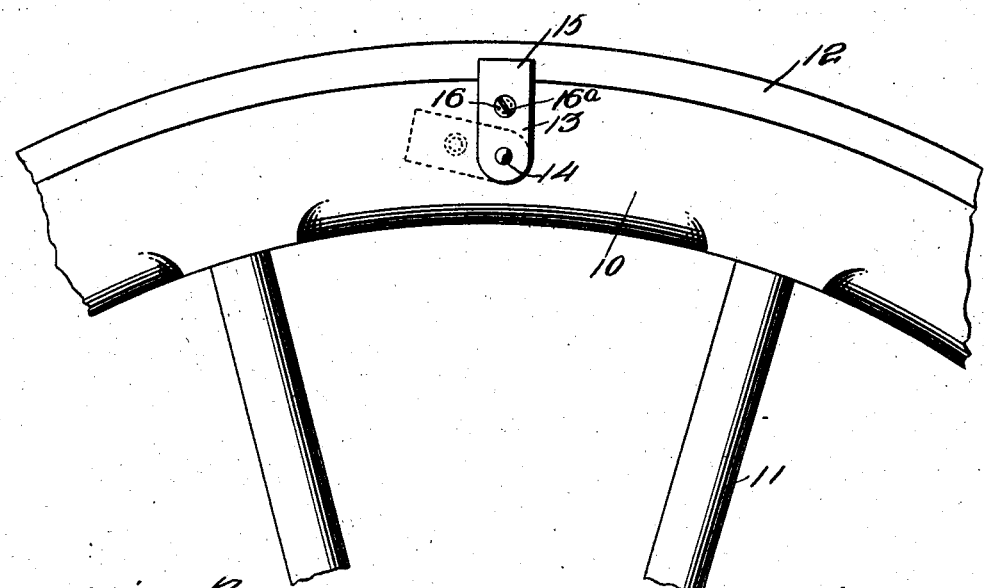
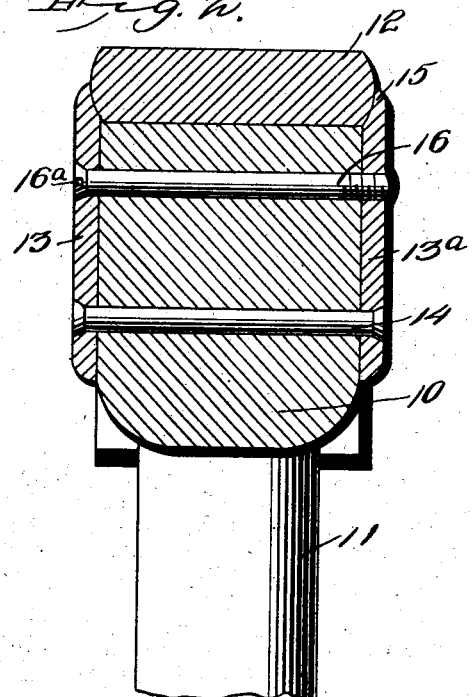
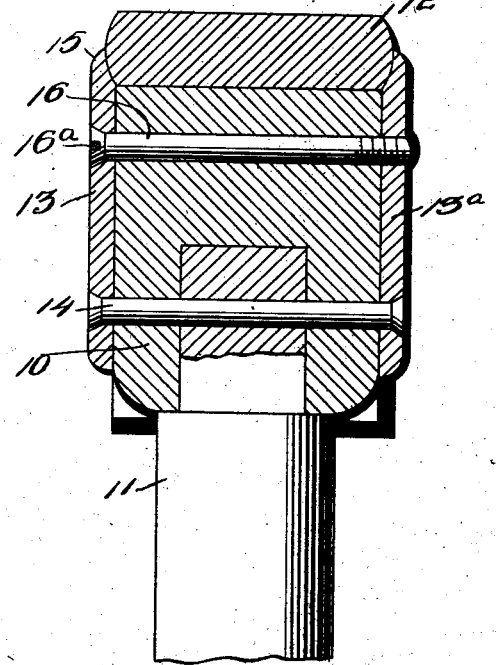
Witnesses
E. G. Stewart
C. N. Woodward
by H. G. Wilson, Inventor
C. A. Snow & Co.
Attorneys

UNITED STATES PATENT OFFICE.

HARVEY G. WILSON, OF UNION, IOWA.

TIRE-FASTENER.

SPECIFICATION forming part of Letters Patent No. 721,266, dated February 24, 1903.

Application filed July 21, 1902. Serial No. 116,464. (No model.)

*To all whom it may concern:*

Be it known that I, HARVEY G. WILSON, a citizen of the United States, residing at Union, in the county of Hardin and State of Iowa, have invented a new and useful Tire-Fastener, of which the following is a specification.

This invention is an improvement in attachments to vehicle-wheels for supporting and securing the tires in place upon the fellies; and it consists in independent clamp-plates attached movably to the opposite sides of the felly and adapted to be extended into engagement with the opposite edges of the tire and detachably secured in that position, whereby the tires are supported from lateral movement and the attachments adapted to be easily removed when required.

The invention further consists in means whereby the fastening devices for the clamp-plates may be utilized to secure the fellies.

Other novel features of the invention will be disclosed in the description following and be specified in the claim.

In the drawings illustrative of the invention, Figure 1 is a side view of a portion of a felly, two of the spokes, and a portion of the tire with the improvement attached. Fig. 2 is a transverse section, enlarged, on the line 11 11 of Fig. 1. Fig. 3 is a transverse section similar to Fig. 2, illustrating a modification of the construction.

The device may be applied to any vehicle-wheel having tires separate from the fellies, and for the purpose of illustration the invention is shown in the drawings applied to an ordinary vehicle-wheel, 10 representing a section of a felly, 11 the spokes, and 12 a section of the tire.

Attached to the felly 10 at suitable points upon opposite sides are independent clamp-plates 13 13ª, each pair of the clamp-plates pivotally connected at their lower ends through the felly by transverse rivets 14 and extending by their upper ends into engagement with the sides of the tire, as shown at 15.

The projecting portions of the clamp-plates, or the portions in engagement with the edge of the tire, conform to the shape of the tire at the edges, as shown in Figs. 2 and 3, so as to closely engage them.

The round-edge tire is in general use, such as indicated in Figs. 2 and 3, and when used with round-edged tires the engaging portions of the clamp-plates will be correspondingly concave, as shown, to fit said round edges; but the clamp-plates will be formed to closely engage the edges of the tire whatever their shape may be. Between the rivets 14 and the tire the clamp-plates will be connected by detachable bolts 16, the bolts being preferably screw-threaded at one end and engaging one of the clamp-plates by said screw-threaded end, as indicated in Figs. 2 and 3, the opposite end of the bolt 16 being provided with means whereby it may be rotated, preferably a cleft 16ª for the reception of a screw-driver. By this simple means the bolt 16 when screwed up will firmly support the plates 13 13ª and clamp them together upon the felly in engagement with the opposite edges of the tire and hold them against accidental turning and the tire from lateral movement. When the plates 13 13ª are to be detached, it is only necessary to remove the screw-bolt 16, when the plates, either or both of them, may be turned downward free from the tire, as indicated by dotted lines in Fig. 1.

When the tire is to be removed, the plates on one side of the felly will be loosened by disengaging them from their screw-bolts and turned down out of the way of the tire, which may then be readily slipped off the felly. When the tire is again placed upon the felly, the plates, as 13ª, are again turned up in engagement with the tire and the bolts, as 16, screwed into engagement therewith.

In Fig. 3 the plates 13 13ª are shown located opposite one of the spokes, and in that event the rivet 14 will be inserted through the tenon 11ª of the spoke, as there indicated. By this simple means the rivet 14 performs a double function—namely, as a pivot for the plates 13 13ª for securing the plates to the felly and prevent their detachment therefrom, and as a means for fastening the spoke and felly together. The clamping-plates thus have a double support in the rivet and screw-bolt, so that the chances for their working loose are remote, and a compact, simple, and efficient tire-clamp provided which will not work loose or rattle and which will likewise effectually prevent the tire from working loose or rattling.

As many of the sets of clamps may be employed as may be required; but generally three sets will be sufficient on an ordinary wheel. The clamp-plates may be of any size, and the rivets and screw-bolts may be correspondingly regulated as to size to proportion them to the wheels and the strains to which they will be subjected.

Having thus described my invention, what I claim is—

The combination of a wheel-felly, a tire supported thereon, independent oppositely-disposed clamp-plates arranged in pairs for engagement with the opposite edges of said tire, a pivot extending through each pair of said plates and through the felly at a point remote from the tire, and on which said plates are independently movable, and a screw-bolt passing through each pair of said pivotally-mounted plates and through the felly at a point between the tire and the pivot, whereby one of said plates may be released independently of the other and swung out of engagement with the tire to permit its removal, and which bolt when screwed to place serves to hold the plates in contact with the tire against accidental turning on their pivot.

In testimony that I claim the foregoing as my own I have hereunto affixed my signature in the presence of two witnesses.

HARVEY G. WILSON.

Witnesses:
C. E. LAWRENCE,
S. CHAMBERLIN.